Dec. 29, 1931.   F. H. PIETZCH ET AL   1,838,445
BRAKE SLACK ADJUSTER
Filed Feb. 6, 1930
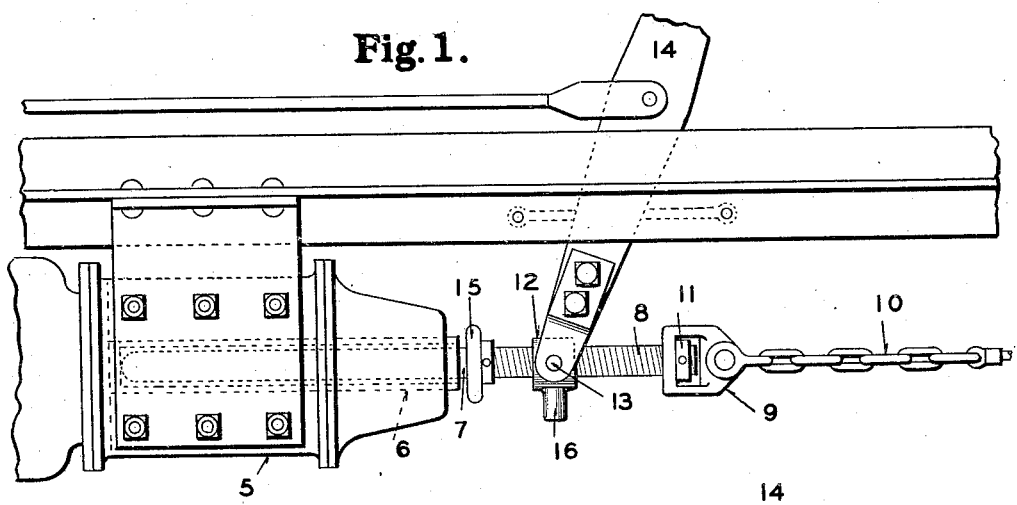
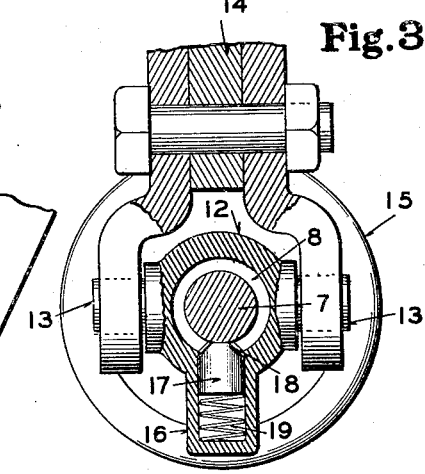
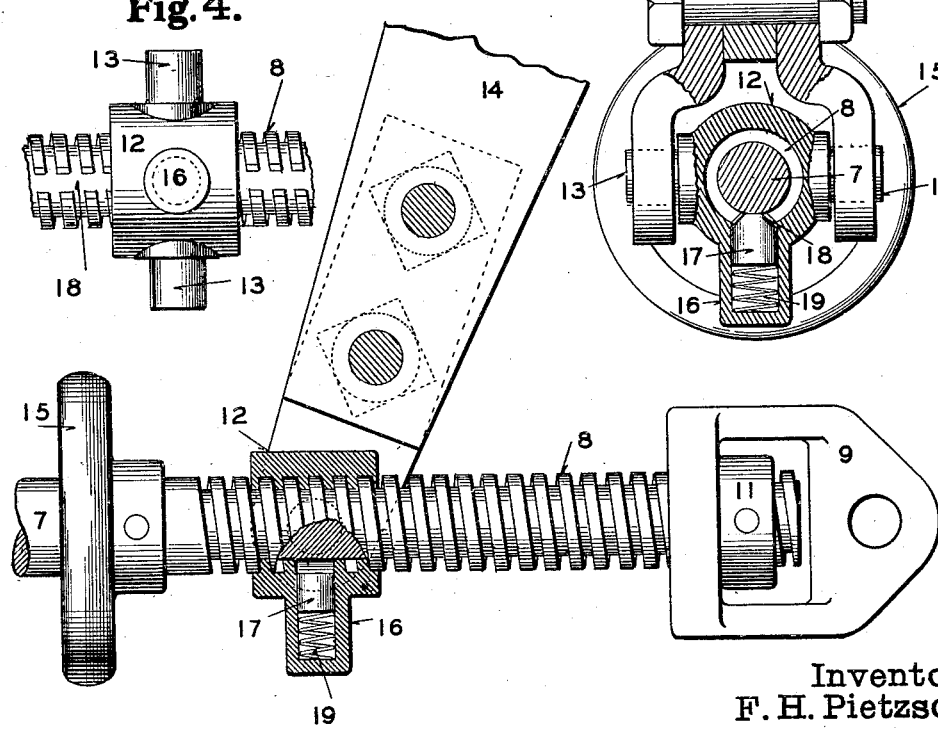
Inventors
F. H. Pietzsch
S. H. Campbell
By
Att'y.

Patented Dec. 29, 1931

1,838,445

UNITED STATES PATENT OFFICE

FRANK H. PIETZSCH AND STERLING H. CAMPBELL, OF ST. LOUIS, MISSOURI, ASSIGNORS TO RAILWAY DEVICES COMPANY, OF ST. LOUIS, MISSOURI, A CORPORATION OF MISSOURI

BRAKE SLACK ADJUSTER

Application filed February 6, 1930. Serial No. 426,240.

Heretofore many forms of mechanisms have been devised for taking up the slack of brake systems for railway cars. As far as we are aware, however, all such devices have either been automatic, taking up all slack by the movement of the parts in applying the brakes, or when manually operated they have been situated at some point remote from the brake cylinder. The objection to the first named type of adjuster is that when cars so equipped are contained in trains also containing cars not so equipped substantially all the braking duty is thrown upon the automatic adjuster equipped cars, subjecting them to undue wear. The objection to the second named type is that the amount of adjustment necessary must be determined by measuring the projecting end of the brake cylinder push-bar, which measurement must be transferred to the adjusting mechanism at a different part of the car not only consuming time but often resulting in incorrect adjustment.

It is the object of our invention to overcome these difficulties by providing manually operated means for adjusting the point of connection between the brake lever and the brake cylinder push-bar.

In the accompanying drawings, which illustrate one form of brake slack adjuster made in accordance with our invention, Figure 1 is a side elevation on a reduced scale; Figure 2 is a detail view, partly in section, of the threaded end of the push-bar and its connection; Figure 3 is an end view, partly in section, of the parts shown in Figure 2; and Figure 4 is a view showing the groove in the threads of the push-bar.

Indicated at 5 is a brake cylinder by which power is applied to the brake through piston rod 6 and its telescoping push-bar 7. The push-bar extends a considerable distance beyond the piston when in its retracted position and is provided with threads 8. On the end of the push-bar is a clevis 9 for providing a swivel attachment for a chain 10, or other connection for the hand operated mechanism so that the chain will not be twisted when the adjustment is made as hereinafter described. A nut 11 threaded and pinned on the bar retains the clevis in position. Surrounding the threaded portion of the bar is a nut 12 having trunnions 13 engaging the forked end of the brake lever 14. A hand wheel 15 is provided for rotating the bar to move the nut along it and thus vary its point of connection with the brake lever. Formed in the nut 12 is a hollow boss 16 in which is a detent 17 having a beveled end engaging a V-shaped way 18 cut longitudinally through the threads 8 at one side of the bar. A coil spring 19 normally holds the detent in the way so as to prevent accidental rotation of the rod in the nut due to vibration. When, however, power is applied to the hand-wheel the action of the inclined sides of the way on the beveled end of the detent forces it back into the boss against the pressure of the spring allowing the rotation of the bar to secure the adjustment.

By the use of our device all or any desired proportion of the slack is taken up by rotating the hand-wheel at the time the travel of the push-bar is measured to determine the amount of slack.

Having fully described our invention, what we claim as new and desire to secure by Letters Patent of the United States is:

1. In a device of the class described, the combination with a brake cylinder, of a push-bar therefor having a projecting externally threaded end, a brake lever, a nut engaging with the threads on said push-bar and pivoted to the brake lever, and manually operated means for rotating said bar to adjust the nut along the same.

2. In a device of the class described, the combination with a brake cylinder, of a push-bar therefor having a projecting end provided with a longitudinal way, a brake lever, a nut on said threaded end and engaging with the brake lever, a spring detent carried by said nut and engaging with said way, and manually operated means for causing relative rotary movement between said bar and nut to adjust the latter along the bar.

3. In a device of the class described, the combination with a brake cylinder, of a push-bar therefor having a projecting end provided with a longitudinal way, a brake lever, a nut on said threaded end and engaging with the brake lever, a spring detent carried by said nut and engaging with said way, a hand-wheel on said bar for manually rotating it to adjust the nut in the direction of the length of the bar.

4. In a device of the class described, the combination with a brake cylinder, of a push-bar therefor, a brake lever actuated from said push-bar, manually operated means for rotating said bar to adjust the point of connection between said bar and brake lever, and a swivel connection on said bar for connection to a hand brake mechanism.

5. In a device of the class described, the combination with a brake cylinder and its piston rod, of a telescoping push-bar cooperating with said rod, said push-bar having screw threads on its periphery, a brake lever, an internally threaded member pivoted to said lever and surrounding said push-bar, and manually operated means for rotating said push-bar in either direction to adjust said internally threaded member along the same.

6. In a device of the class described, the combination with the push-bar of a railway brake, said push-bar being externally threaded, of a brake lever, an internally threaded member pivoted to said brake lever and surrounding the push-bar, a hand wheel carried by said push-bar, and a swivel connection also carried by said bar for connection with a hand brake mechanism.

In testimony whereof, we hereunto affix our signatures, this 1st day of February, 1930.

FRANK H. PIETZSCH.
STERLING H. CAMPBELL.